UNITED STATES PATENT OFFICE.

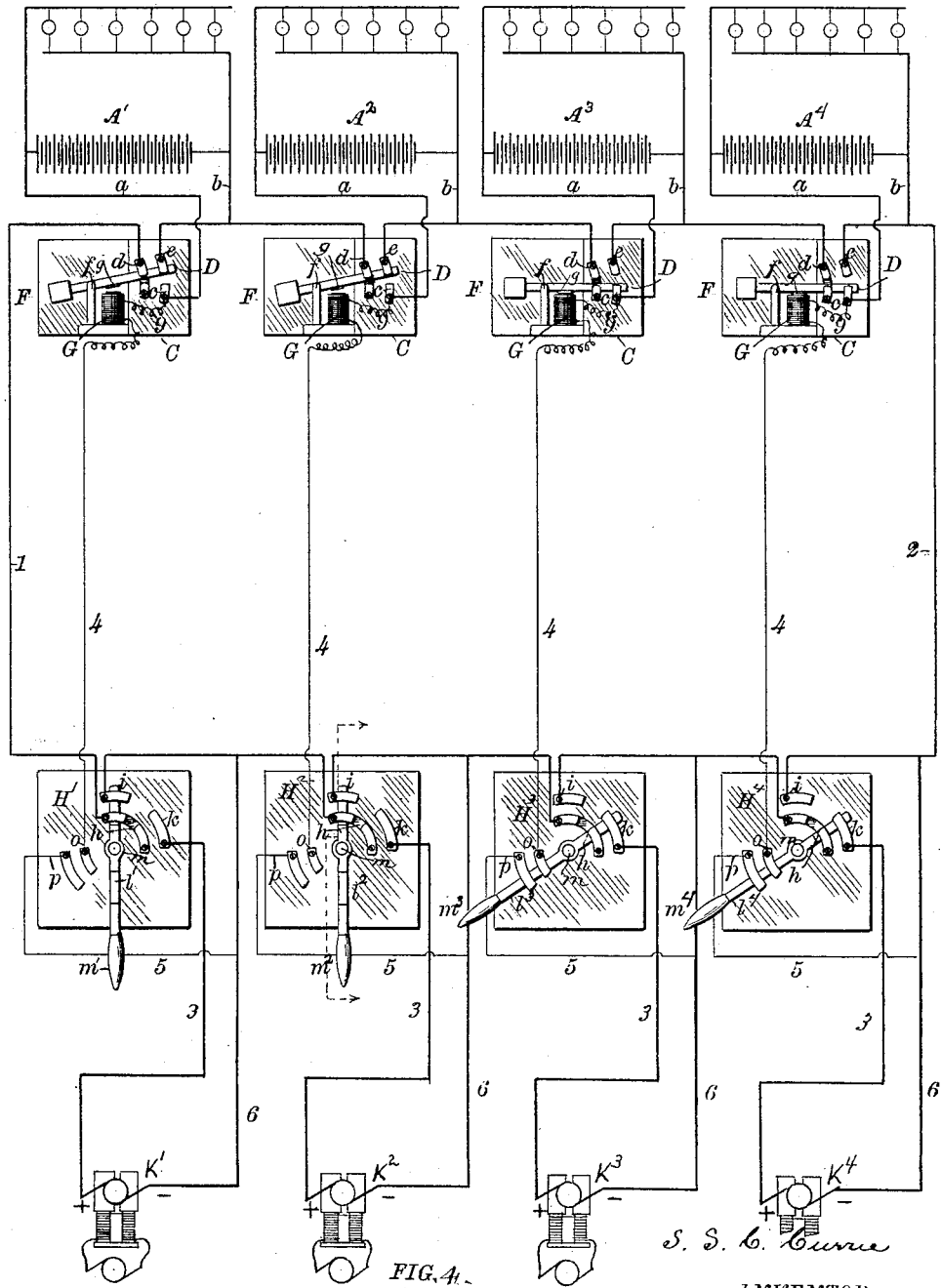

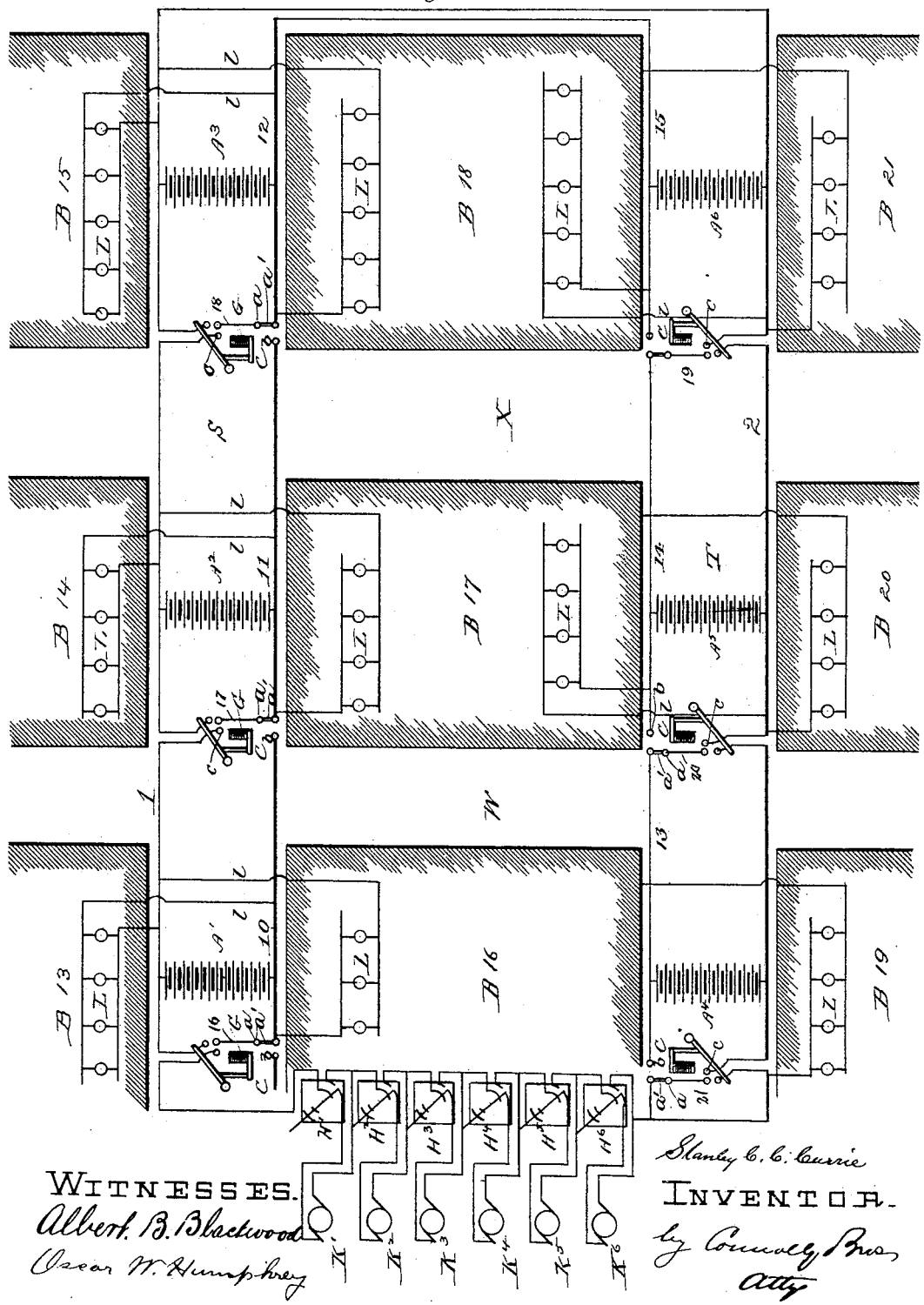

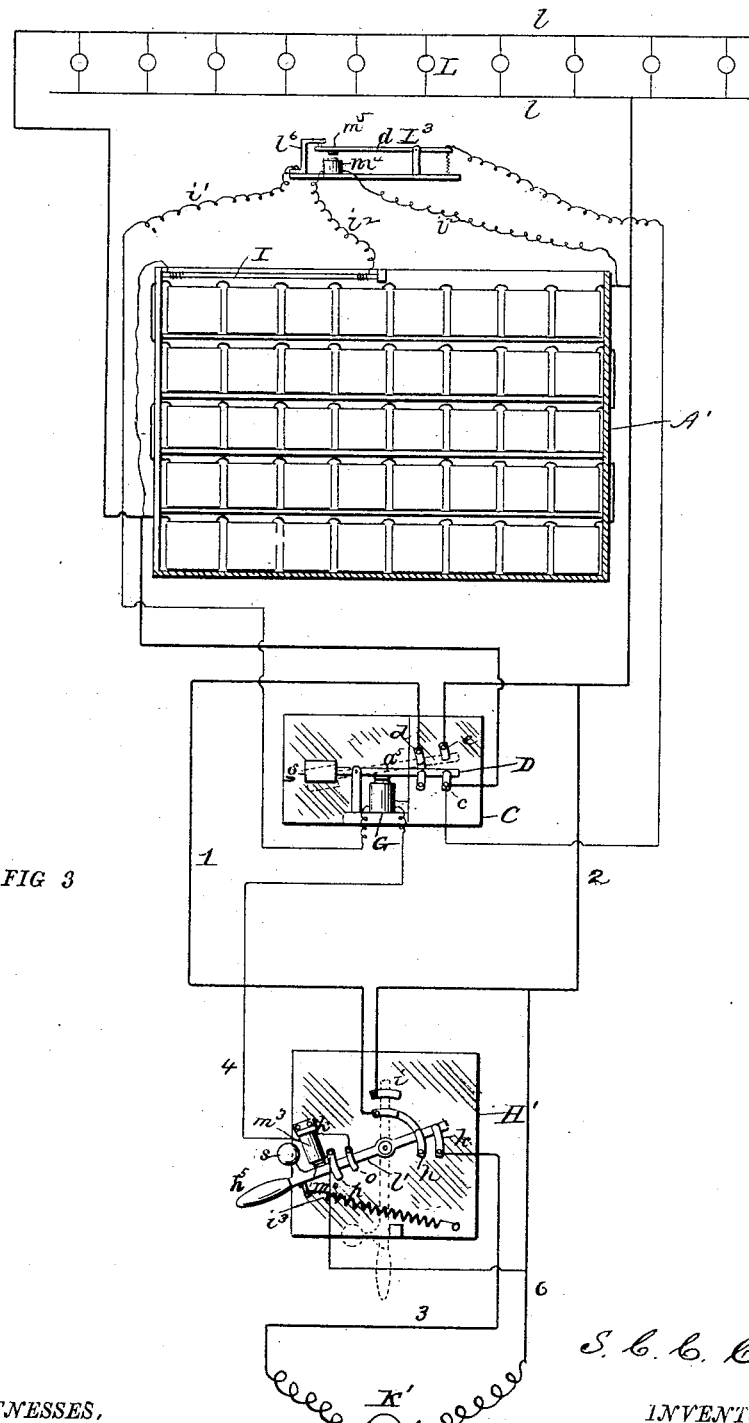

STANLEY C. C. CURRIE, OF PHILADELPHIA, PENNSYLVANIA, ASSIGNOR TO THE UNITED ELECTRIC IMPROVEMENT COMPANY, OF GLOUCESTER, NEW JERSEY.

ELECTRIC DISTRIBUTION BY STORAGE-BATTERIES.

SPECIFICATION forming part of Letters Patent No. 400,395, dated March 26, 1889.

Application filed May 16, 1888. Serial No. 274,061. (No model.)

*To all whom it may concern:*

Be it known that I, STANLEY C. C. CURRIE, a subject of the Queen of Great Britain, residing at Philadelphia, in the county of Philadelphia and State of Pennsylvania, have invented certain new and useful Improvements in Systems of Electrical Distribution; and I do hereby declare the following to be a full, clear, and exact description of the invention, reference being had to the accompanying drawings, which form part of this specification.

This invention has relation to systems of electrical distribution, and relates more particularly to that class of distributive systems wherein a number of accumulators or secondary batteries are employed as distributing centers for independent districts, and wherein the accumulators are arranged for charging in series upon a single main conductor conveying the charging current from a distant source of electrical supply.

In systems of this class it is advantageous, particularly in systems wherein the dynamo plant is at some distance from the accumulators, to employ but a single main conductor; but where this is done there is waste of energy at times, due to the fact that there is sure to be variation in the amount of current taken from each battery or group or set of accumulators in a given period, and hence when any one of the accumulators, or one of the sets of accumulators, is exhausted or in a state or condition for charging, the others of the series may not be exhausted to the same extent, or, indeed, may be fully charged, and therefore it of necessity happens that in order to charge the particular exhausted battery the current must be driven through those already charged, thereby incurring loss of energy and a possibility of injury to the already charged accumulators. Hence it is necessary that each battery or set of accumulators in a series of the same arranged upon a single main line should be capable of being charged separately and independently of the rest when required. Now, to do this by main conductors to each set would be to do away with the great economy effected in saving of first cost by the use of a single main conductor when the whole of the accumulators are charged in series upon a single main conductor, and particularly is this the case where the dynamo-station is at a distance from the accumulators.

My invention has for its object the provision of means whereby any battery or set of accumulators in a series of accumulators or sets of the same arranged in series on a single main conductor may be separately charged at will.

In carrying my invention into effect I provide at the dynamo-station a dynamo for each separate battery or set of accumulators, with an electro-motive force proportional to the particular battery it represents, and also provide electric switches and electro-magnetic cut-out devices so arranged, as will be presently described, that each accumulator or set of accumulators in the series may be thrown out of electrical connection with the main circuit, and that the dynamo belonging to the same may be simultaneously thrown in or out of circuit by the movement of a single lever.

My invention consists of the novel construction, combination, and arrangement of parts hereinafter described and specifically claimed.

Referring to the accompanying drawings, Figure 1 is a diagram illustrating the arrangement of parts and the necessary electric curcuits, &c., of an electric-lighting system constructed and arranged according to my improvements. Fig. 2 is a similar view illustrating the application of my improvements to street-lighting. Fig. 3 is a view in plan and diagram of a modification of my invention, including means for causing an accumulator and its dynamo to be automatically cut out of circuit with the main line when fully charged; and Fig. 4 is an elevation of the switch.

1 designates the main-line conductor, and 2 the return-circuit of the same. $A'$ $A^2$ $A^3$ $A^4$ designate individual sets of secondary batteries or accumulators, and L L lamps arranged on lines $l$ $l$ leading from said accumulators. The accumulators $A'$ $A^2$ $A^3$ $A^4$ are electrically connected to the main line 1 by branch conductors $a$ and $b$. The conductors $b$ lead directly to and are permanently connected to the main line 1, while the conductors $a$ terminate at a contact-point, $c$, on switch-board C. The main-line conductor 1 is divided into sections, as shown, which terminate at contact-points $d\ e$ on the switch-boards C C, and a pivoted switch-lever, D, on each board connects the contact-points $d\ d$ with the points $c$ and $e$ alternately, according to its position.

The levers D are pivoted at $f$ and provided with counter-weights or springs F, which serve under the normal condition of affairs to bear down the outer ends of levers D and preserve circuit between points $d$ and $e$. Small electro-magnets G are mounted on switch-boards C below the levers D, and the armatures $g$ of said magnets are attached to said levers, so that when the magnets are energized the lever will be drawn down and circuit thereby established between contact-points $c$ and $d$.

$H'\ H^2\ H^3\ H^4$ designate switch-boards arranged at the dynamo-station or at other appropriate point on the main line 1, and said main line has contact-points $h\ i$ on each of said boards, and in proximity to said points $h\ i$ are contact-points $k$, which form the terminals of lines 3 3 3 3, leading from dynamo-electric machines or other electric generators $K'\ K^2\ K^3\ K^4$.

Switch-levers $l'\ l^2\ l^3\ l^4$ are pivoted at $m$ upon the boards $H'\ H^2\ H^3\ H^4$, and are formed with handles $m'\ m^2\ m^3\ m^4$, by means of which said levers may be manipulated so as to alternately connect contact-points $i\ k$ with contact-points $h$. The levers $l'\ l^2\ l^3\ l^4$ are double-ended, the ends being insulated from each other, and near the lower ends of the levers are contact-points $o$ and $p$, the former of which form the terminals of auxiliary circuits 4 4 4 4, leading through magnets G and terminating at contact-point $c\ c$, while the latter form terminals of lines 5 5 5 5, leading to the conductors 6 6 6 6 of generators $K'\ K^2\ K^3\ K^4$ from the main line 1.

In Fig. 1 of the drawings the accumulators $A^3\ A^4$ and the generators $K^3\ K^4$ appertaining thereto are shown as in electric connection with the main conductor—that is, in position for charging—while the generators $K'\ K^2$ and their accumulators $A'\ A^2$ are disconnected from the said main conductor, taking, for example, the generator $K^4$ and the accumulator $A^4$, which, as before said, are in electrical connection with the main line 1 2. The handle $m^4$ on the switch-board $H^4$ being raised, the lever $l^4\ m^4$ is swung around on its pivot, thereby disconnecting points $h$ and $i$ and connecting point $h$ with contact-point $k$. The lower end of the lever $l^4$ simultaneously forms contact between points $o$ and $p$, and the generator $K^4$ is thereby immediately placed in the main-line circuit by way of conductors 3 and 6 and contact-points $h\ k$. At the same instant a circuit is established through magnet G by way of lines 4 and 5, contact-points $o$ and $p$, through a line, 9, leading to the conductor $a$ of the accumulator $A^4$, thence through the accumulator to the main conductor 1 by the line $b$. The energizing of the magnet G causes its armature to be drawn down, bringing down with it the lever D, and by the movement of the latter breaking contact between points $d$ and $e$ and establishing contact between $d$ and $c$, which places the accumulator in direct circuit with main conductor 1. This condition of affairs is preserved until the accumulator $A^4$ is fully charged, whereupon, by moving the lever $m^4$ back to its original position, the generator $H^4$ is thrown out of circuit with main conductor 1, the circuit through magnet G is broken, the weight D causes the switch-lever to raise, thus breaking contact between $d\ c$, and thus cutting out the accumulator from electrical connection with the main line or conductor 1.

As the construction of the connections and operating parts of each accumulator and its appropriate generator, the cut-out, switch-board, &c., is the same as that of all the others, it will be unnecessary to describe the operation of more than one of the same, it being merely observed that all or any number of the accumulators in the system may be charged at once.

It is to be noticed that, while I have shown and described an arrangement wherein a separate generator is appropriated to each set of accumulators, an obvious modification would be to employ a single generator having a pair of brushes for each set of accumulators in the series.

In Fig. 2 of the drawings I have illustrated my invention in its application to the lighting of cities or towns, and in said figure I have shown and will now describe an arrangement of the devices hereinbefore described, whereby my invention is made particularly applicable to the lighting of blocks of buildings by means of accumulators arranged in the immediate vicinity of the buildings to be supplied and generators arranged at a distance. In said figure the blocks or squares of buildings are lettered $B^{13}\ B^{14}\ B^{15}\ B^{16}\ B^{17}\ B^{18}\ B^{19}\ B^{20}$ and the streets S T W X.

The accumulators and electro-magnetic devices by means of which the same are thrown into and out of circuit are the same in construction and operate in the same manner as those shown in Fig. 1, and need not therefore be particularly described.

1 designates the main-line conductor, 2 the return-conductor of the same, and $K'\ K^2\ K^3$, &c., the dynamo-electric or other electric generators.

Each block or group or system of lamps corresponding to the particular battery from which they are supplied has a set of branch wires, to which again each house-circuit can be readily connected. These branch wires will, as a rule, extend the whole distance of each block, the size and weight depending, of course, upon the number of lamps to be supplied. These branch or supplementary conductors, being thus conveniently arranged parallel to the main conductors 1 and 2 and approaching one another at their terminals, are so placed that two or any number of them may be readily electrically connected by means of a plug or similar device.

The accumulators $A'$ $A^2$ $A^3$ $A^4$ $A^5$ $A^6$ are connected each at one pole to the main conductor and at the other to the branch or supplemenal mains, and the latter have branches 16 17 18 19 20 21, which terminate at the point $c$ of the cut-out switch-boards C, as shown.

The lamp-circuits are led from the mains 1 or 2, and the branch or supplemental mains 10 11 12 13 14 15 and the number of sets of lamps or the number of lamps in each set will vary according to the capacity of the accumulators supplying the same.

L L designate the lamps; $l\,l$, the circuits leading thereto from the main conductors 1 2 and the supplementary conductors 10 11 12 13 14 15.

Under the arrangement shown in Fig. 2, if any one or any number of the accumulators $A'$ $A^2$, &c., should become disorganized or incapacitated for work, the lamps on the circuit or circuits of such accumulator or accumulators may be supplied by one or a number of the other accumulators of the system, provided, of course, that the intermediate magnetic switch is fixed in normal position and in the following manner: Let it be supposed the accumulator $A^3$ has become incapacitated, thereby causing the extinguishment of lights on both sides of the block or street within the block. Now, in order to supply the lamps which normally receive current from accumulator $A^3$, it is only necessary to connect the branch or supplementary conductors 11 12, whereupon the current from $B^{14}$, accumulator $A^2$ will find a pathway by way of main conductor 1 and supplementary conductors 11 12 (now electrically connected) and the wires $l\,l$, leading to the lamps in blocks $B^{15}$ $B^{18}$, the relative magnetically-controlled switch being in its normal position. If the magnetically-controlled switch were not in normal position when the conductors 11 and 12 were connected, the battery in said section would be "short-circuited." In order to insure against the risk of so short-circuiting the battery, a suitable switch can be arranged at points $a$ and $b$, so that when connection was made at $b$ the circuit at $a$ was broken.

By connecting the supplementary conductors 10 and 11 it will be observed that current from accumulators $A'$ $A^2$ will be supplied to the lamp-circuit of accumulator $A^3$.

In short, the whole system of batteries or any part of the system can at any time, if desired, be put in parallel or multiple arc, thus affording a most important and valuable feature of the invention.

In Fig. 3 of the drawings I have shown and will now describe a novel device whereby each accumulator or individual set of accumulators and its appropriate generator is automatically cut out of circuit with the main line when it is fully charged. In this device the general construction and arrangement of parts is the same as that shown in Fig. 1—that is to say, the switch-boards C and H, the accumulator, and the dynamo-machine all occupy the same relative positions and operate in the same manner, and in both figures the same letters of reference are employed to designate like parts. In said Fig. 3 an electro-magnet, $m^3$, is placed in the shunt-circuit 4 and the armature $m^4$ of said magnet is carried on the switch-lever $l'$. A retractible spring, $i^3$, serves to return the said lever to its normal position when magnet $m^3$ is de-energized. A pivoted and weighted lever-arm, $L^3$, is arranged in the vicinity of the accumulator, and said lever-arm and a stop, $l^6$, with which it contacts, are arranged in the shunt-circuit with the magnet $m^3$ and the magnet G.

Below the lever-arm $L^3$ is placed an electro-magnet, $m^4$, and the armature $m^5$ of said magnet is carried by the said lever-arm $L^3$. The magnet $m^4$ is placed in a circuit, $i^2$, that connects with the positive and negative plates of the accumulator, and in said circuit $i^2$ is arranged a strip or section of a high-resistance material, I, which normally offers such resistance to the passage of a current through circuit $i^2$ that the magnet $m^4$ is inactive, but which, when moistened by the deposit of spray that results from ebullition of gas, which takes place when an accumulator is fully charged, will conduct sufficient current to energize said magnet.

The operation of the devices shown in Fig. 3 is as follows: When the battery is in need of charging, the switch-lever $l'$ is turned until contact is made between $o$ $p$ and $k$ $h$, as before explained. This movement of the switch-lever brings the dynamo into circuit with the main line, and by the energizing of magnet G simultaneously brings the battery into the main circuit through the movement of lever D. The circuit through magnet $m^3$, shunt-line 4, magnet G, and lever $L^3$ being complete, the magnet $m^3$ retains the lever $l'$ in the position to which it has been turned. The parts remain in the same position until the battery becomes charged. As soon as this is accomplished, an ebullition of the liquid contents of the accumulator begins and a spray or mist is thrown up from the surface of the liquid. The resistance-piece I soon becomes moistened to a sufficient degree to conduct current. Magnet $m^4$ is thereupon energized and attracts lever-arm $L^3$, thereby breaking circuit 4. When circuit 4 is broken, magnets G and $m^3$ are de-energized and the lever-arms $l'$ D return to their first position, thereby cutting out of the main line both the accumulators $A'$ and the generator $K'$.

In this system I prefer that the dynamos be separately excited, and I have shown the dynamos $K'$ $K^2$ $K^3$ $K^{4b}$ with field-magnets $k^6$ $k^7$ $k^8$ $k^9$, separately excited by means of generators $k^{10}$ $k^{11}$ $k^{12}$ $k^{13}$. The reason for this will be obvious. Suppose, for instance, that a system of six dynamos and six batteries is arranged at a distance, as in above specification. Now let it be supposed that at any particular time five dynamos are running and charging the corresponding five batteries. If, then, the operator should suddenly turn on the sixth dynamo, the moment this is done the tendency would be at once for the dynamo suddenly thrown into circuit to be reversed in polarity. This, however, could be obviated by keeping all the dynamos running at full speed whether with or without the load on, and by thus keeping the full potential at the terminals $m$. I prefer, however, to have them separately excited.

I claim—

1. In a system of electrical distribution, the combination, with a main-line conductor, one or more electric generators normally out of circuit with said conductor, and an equivalent number of groups of accumulators, secondary batteries, or equivalent electric storage devices, of a manually-operated switch appropriated to each generator, constructed and arranged so as to throw said generator into or out of the main-line circuit, an electro-magnetica'ly operated switch having its operating-magnet in a shunt of the main-line circuit, constructed and arranged so as to throw its appropriate accumulator into or out of the main-line circuit, and of a conductor leading to the accumulator, whereby the operation of the manual switch will simultaneously throw its generator and accumulator into the main-line circuit, substantially as described.

2. In a system of electrical distribution, the combination, with a plural number of electric generators and a plural number of electric distributing devices, as storage-batteries or the like, and a main-line conductor, of a manually-operated switch, and an electrically-operated switch appropriated to each generator and connected by a conductor and so arranged that the movement of the manual-switch will establish circuit through said electrically-operated switch, and thereby throw its generator and battery into the main-line circuit simultaneously, substantially as described.

3. In a system of electrical distribution, the combination, with a main-line conductor and a plural number of accumulators or secondary batteries, of means comprising manually-operated and electrically-operated switches having contact-points connected with the main-line conductors and with conductors leading to said accumulators and connected by shunt-lines, whereby a generator and its appropriate accumulators may be simultaneously thrown into and out of the main-line circuit by the movement of a single lever, substantially as described.

4. In a system of electrical distribution, the combination, with the main-line conductor, an electric generator, an accumulator, a manually-operated switch, and an electro-magnetically-operated switch, and a shunt-line connecting the two switches, of an automatic circuit-breaker arranged in said shunt-line and constructed and arranged to break the shunt-circuit, and thereby cause the switches therein to simultaneously cut out the generator and the accumulator from the main-line circuit, substantially as described.

5. In a system of electrical distribution, the combination of a plural number of electric generators, a plural number of accumulators or secondary batteries with a series of branch or supplementary main conductors, each permanently connected to one pole of an accumulator, and a switch by means of which said branch conductors may be electrically connected with the main conductor, and the said supplementary conductors having their terminals so arranged as to be readily connected, substantially as described.

6. In a system of electrical distribution, the combination, with a main-line conductor, an electric generator, and an accumulator, of a supplementary main conductor, lamp circuits or wires connected to said main conductor, and an electric switch by means of which the supplementary conductor and the accumulator may be thrown in circuit with the main conductor, substantially as described.

7. In a system of electrical distribution, the combination of a main-line conductor, a number of electric generators, a number of accumulators, a number of branch or supplementary conductors, electrically-operated switches arranged one in the vicinity of each supplementary line, manually-operated switches connected to said electrically-operated switches by a shunt-line, and an automatic circuit-breaker arranged on said shunt, said circuit-breaker having its operating-magnet in an independent circuit controlled by the condition of the accumulator, substantially as described.

In testimony that I claim the foregoing I have hereunto set my hand this 30th day of April, 1888.

STANLEY C. C. CURRIE.

Witnesses:
JOSEPH J. KNOX,
BOYD C. BARRINGTON.